US010516553B2

(12) United States Patent
McAndrew et al.

(10) Patent No.: US 10,516,553 B2
(45) Date of Patent: *Dec. 24, 2019

(54) INTEGRATION OF PHYSICAL AND VIRTUAL LMR NETWORKS

(71) Applicants: Niall McAndrew, Christchurch (NZ); Nick Clark, Christchurch (NZ); Clive Douglas Horn, Christchurch (NZ); Steve Penny, Christchurch (NZ)

(72) Inventors: Niall McAndrew, Christchurch (NZ); Nick Clark, Christchurch (NZ); Clive Douglas Horn, Christchurch (NZ); Steve Penny, Christchurch (NZ)

(73) Assignee: TAIT INTERNATIONAL LIMITED, Christchurch (NZ)

( * ) Notice: Subject to any disclaimer, the term of this patent is extended or adjusted under 35 U.S.C. 154(b) by 0 days.

This patent is subject to a terminal disclaimer.

(21) Appl. No.: 15/639,309

(22) Filed: Jun. 30, 2017

(65) Prior Publication Data
US 2018/0006844 A1    Jan. 4, 2018

(30) Foreign Application Priority Data

Jun. 30, 2016 (AU) ............................... 2016902579

(51) Int. Cl.
*H04L 12/66* (2006.01)
*H04W 60/00* (2009.01)
*H04W 40/00* (2009.01)
*H04L 29/12* (2006.01)

(52) U.S. Cl.
CPC .......... *H04L 12/66* (2013.01); *H04L 61/2007* (2013.01); *H04W 40/00* (2013.01); *H04W 60/00* (2013.01); *H04L 61/6018* (2013.01)

(58) Field of Classification Search
None
See application file for complete search history.

(56) References Cited

U.S. PATENT DOCUMENTS

| 8,320,897 B2 | 11/2012 | Miller et al. |
| 8,406,800 B2 | 3/2013 | Miller et al. |
| 8,976,730 B2 | 3/2015 | Chu et al. |
| 9,172,678 B2 | 10/2015 | Wang et al. |
| 9,252,982 B2 | 2/2016 | Jobe et al. |
| 9,516,462 B2 | 12/2016 | Yuk et al. |

(Continued)

OTHER PUBLICATIONS

"VIDA Network Management," Harris assuredcommunications, <https://www.harris.com/sites/default/files/downloads/solutions/vida-centralized-network-manager.pdf>, Jan. 2015.

*Primary Examiner* — Peter Chen
*Assistant Examiner* — Jeff Banthrongsack
(74) *Attorney, Agent, or Firm* — Womble Bond Dickinson (US) LLP

(57) ABSTRACT

Integration of a land mobile radio (LMR) communications system and other wireless IP based systems such as LTE by way of a virtual router and virtual base stations. The LMR system may be either trunked or conventional. The virtual router maintains LMR IDs and also IP addresses for both physical and virtual base stations, multi bearer terminals and other components of the integrated system. Physical LMR base stations form a physical network. Virtual LMR base stations form a virtual network. These physical and virtual LMR networks communicate using ISSI, AIS or DFSI for example.

7 Claims, 17 Drawing Sheets

(56) References Cited

U.S. PATENT DOCUMENTS

Figure 1:
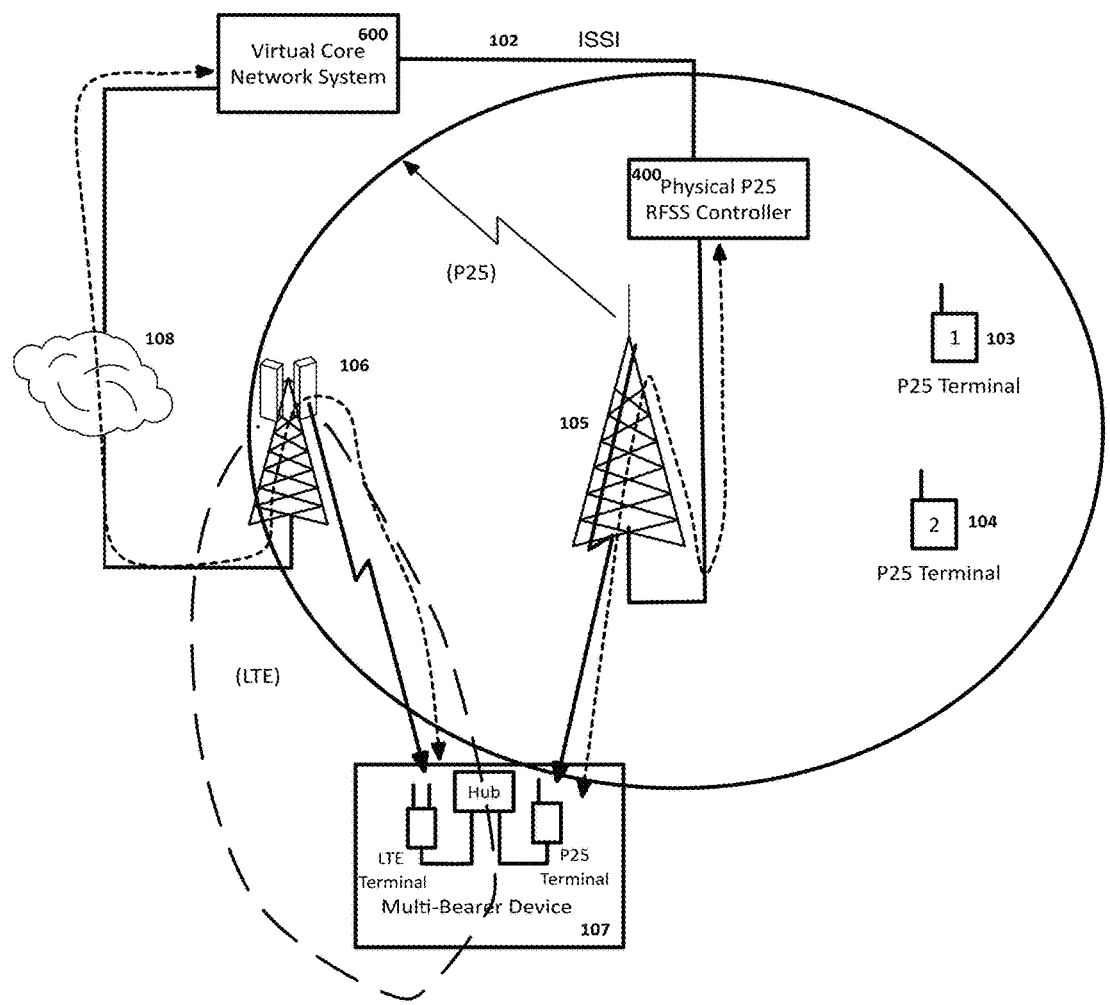

| | | | |
|---|---|---|---|
| 2005/0073964 A1* | 4/2005 | Schmidt | H04L 29/06027 370/260 |
| 2010/0135197 A1* | 6/2010 | Martinez | H04L 12/189 370/312 |
| 2012/0044876 A1 | 12/2012 | Taaghol | |
| 2013/0044710 A1* | 2/2013 | Martinez | H04L 12/4633 370/329 |
| 2015/0092650 A1 | 4/2015 | Mehrotra et al. | |

* cited by examiner

INTEGRATION OF PHYSICAL AND VIRTUAL LMR NETWORKS

CROSS-REFERENCE TO RELATED APPLICATIONS

This patent application claims the priority of Australian Patent Application No. 2016902579, filed Jun. 30, 2016, the disclosure of which is incorporated by reference in its entirety for all purposes.

FIELD OF THE INVENTION

This invention relates to integration of services between a land mobile radio (LMR) communications system and other technology such as cellular that can offer relatively high data rates needed to support an encoded voice stream.

An architecture is described which is used to integrate LMR networks to an IP network such that a multi-bearer capable terminal can pass messages and voice via either path and observe normal LMR behaviour. The IP network may be established over a cellular network though generally any IP network capable of supporting the required bandwidth of operation may be used, including both commercial and private networks.

BACKGROUND TO THE INVENTION

Public safety agencies around the world typically use relatively narrow band, LMR technologies such as P25 to communicate voice information and some data traffic. Characteristics of this technology are long range and high quality voice. Today, Public Safety is considering the use of new technologies, such as LTE, capable of high rate data enabling mobile data applications. This form of technology is relatively short range compared to relatively narrow band technologies. In a move to capture the benefit of both technologies, methods of integration are being considered.

Previous attempts to enable LMR across a cellular network generally select between an LMR voice call or a Push To Talk over Cellular call operating over an IP network. In other words, the protocols for each path are different.

One approach that has been used in the past is a gateway between LMR and cellular. Methods of this type are subject to a number of drawbacks including; a mismatch of audio quality on either side, an incompatible feature set on either side, and loss of ability to establish end-to-end encryption. These mismatches generally occur because the protocols used on either side of the gateway are different.

Another approach that has been considered in the past is to tunnel LMR within IP. This approach avoids the mismatch of protocols causing issues when operating across a gateway. This approach is limited to the specific core network implementation of a particular manufacturer.

Typically, LMR systems are deployed over wide areas where public safety operation is expected including both populated and unpopulated areas. Typically, cellular systems are deployed over populated areas or areas where revenue can be generated through user traffic. There are areas where LMR exists but no cellular. There are areas where cellular exists but no LMR. There are areas where both LMR and cellular exist. Historically there have been innovations that seek to communicate calls using PTToC over cellular or LMR over RF depending upon which bearer is available.

Typically LMR systems exist in two forms. The first is referred to as "conventional". In this configuration a radio channel is used by a group of terminal devices where the communication is conducted by a repeater that is typically located on a physically high site. The user of the terminal will typically make a manual choice of channel number through choosing that channel via a selection knob on the terminal. Upon pressing a push to talk button on that terminal, the voice is then received by any other terminal that is configured to listen to that channel. In its simplest form, any terminal listening to the channel will unmute. This is one way of creating group communications.

Still considering conventional communications, a group can also be created according to a group identity. The group identity is normally a specific number that identifies the group. This identity is sent along with the voice information and now any terminal that is both listening to the channel and a member of this group will unmute.

The other form of system typically used in LMR is "trunked". In this case, there is typically one control channel and several traffic channels. In effect, a trunked system is a centrally controlled network or trunked controller. All terminals not in a voice call will listen to the control channel. If a call is initiated then they are sent to a traffic channel. Any trunked terminal wishing to access the network must first register with the network. This represents a form of identification to ensure the terminal is permitted on the network. Registration normally takes place when the terminal is switched on, changed into trunked mode or when the terminal enters coverage of the control channel while in a trunked mode. All trunked terminals must register.

Following registration, all trunked terminals must then identify which groups they are a part of. This is required so that a trunked system can make sure there is a channel available at each site that has a terminal affiliated to the group calls target. This group information (referred to as group affiliation) is knowledge held by a central controller.

Ideally, solutions are required that integrate LMR RF channels and IP capable bearers in such a way that a user is unaware of the communication bearer being used. In other words, the terminal always appears to function as a normal LMR radio whether conventional or trunked.

An LMR system is typically Frequency Division Multiple Access (FDMA) or Time Division Multiple Access (TDMA). A channel can be defined as a frequency, frequency pair, or time slot on a frequency or frequency pair.

SUMMARY OF THE INVENTION

It is an object of the invention to provide a method of enabling normal LMR operation over an IP network or at least to provide an alternative to existing attempts to provide LMR operation of this kind.

In one aspect a virtual LMR network established on an IP network is connected via ISSI to a physical LMR network. The virtual LMR network is aware of group membership on the physical LMR network. Calls arriving via the IP network are connected into calls on the physical network. This provides an ability to create virtual LMR channels via IP that can be used to supplement existing RF channels.

In another aspect the invention is a method of operating a router in a multi bearer radio system having an LMR bearer and an IP bearer. Device data is established in the router having an LMR ID and an individual IP address for each of a plurality of multi bearer devices in the system. Physical site data is established in the router having an LMR ID and an individual IP address for each of a plurality of physical LMR bearer base stations in the system. Virtual site data is also established in the router having an LMR ID and an individual IP address for each of a plurality of virtual LMR base stations in the system.

In one embodiment the physical LMR bearer base stations form part of a first network and the virtual LMR base stations form part of a second network, and the networks communicate using ISSI, AIS or DFSI.

In a further aspect the invention resides in a communication system for multi-bearer devices. A first network has sites with cellular base stations and a second network has sites with virtual LMR base stations. The multi-bearer devices communicate with the cellular base stations using IP wireless messages while the cellular base stations communicate with the virtual LMR base stations through a router using IP messages. Preferably a third network has sites with physical LMR base stations and the virtual LMR virtual base stations communicate with the physical LMR base stations using ISSI, AIS or DFSI.

In another aspect range extension takes place whereby the total coverage area available to users is formed by the union of an LMR bearer and one or more suitable cellular bearers able to support an IP connection carrying the LMR information. Preferentially this enables coverage extension for the user of the LMR device.

LIST OF FIGURES

Preferred embodiments of the invention will be described with respect to the accompanying drawings, of which:

FIG. 1 A multi-bearer architecture using physical and virtual LMR networks.

Figure 2:
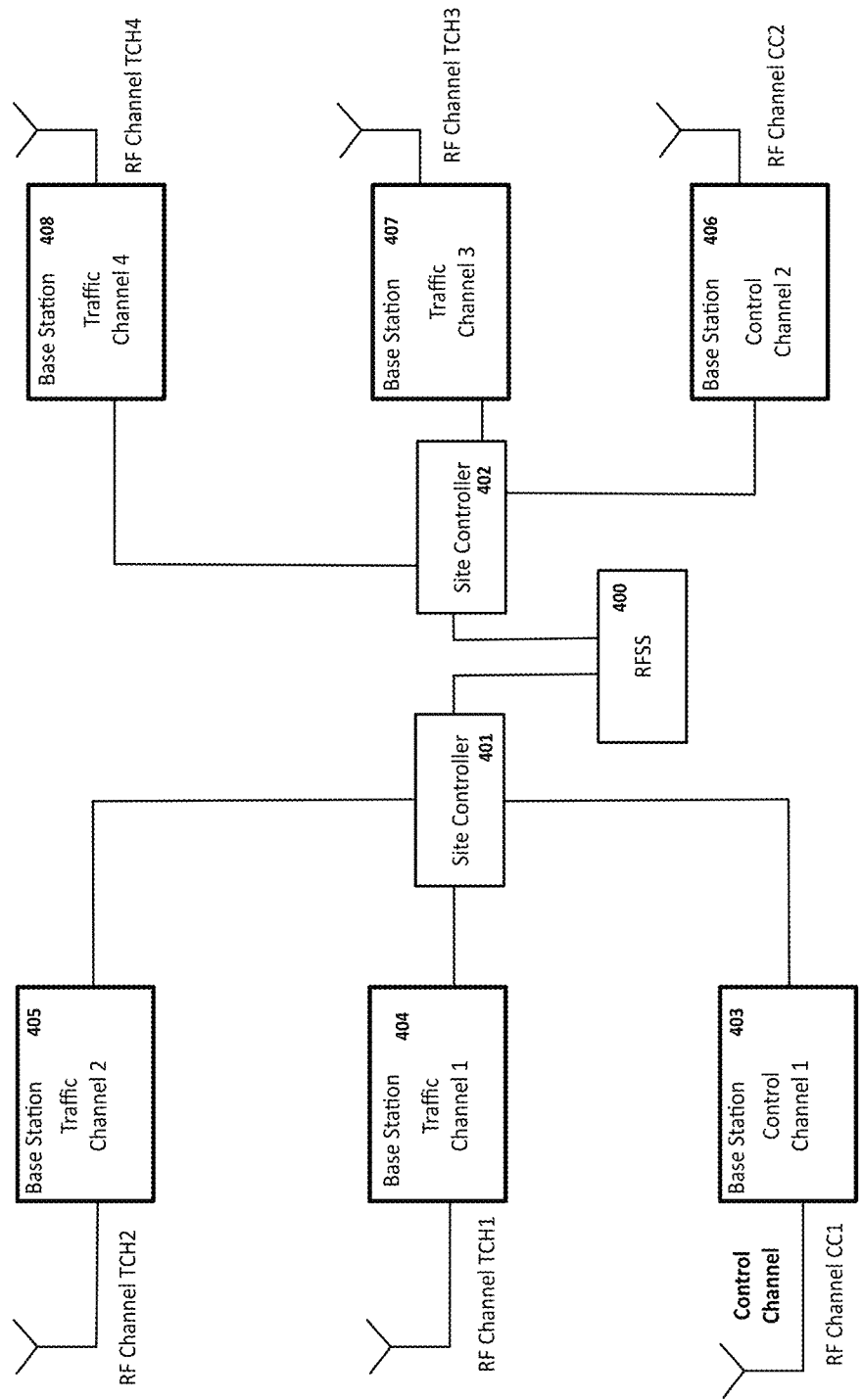

FIG. 2 A typical physical trunked network configuration.

Figure 3:
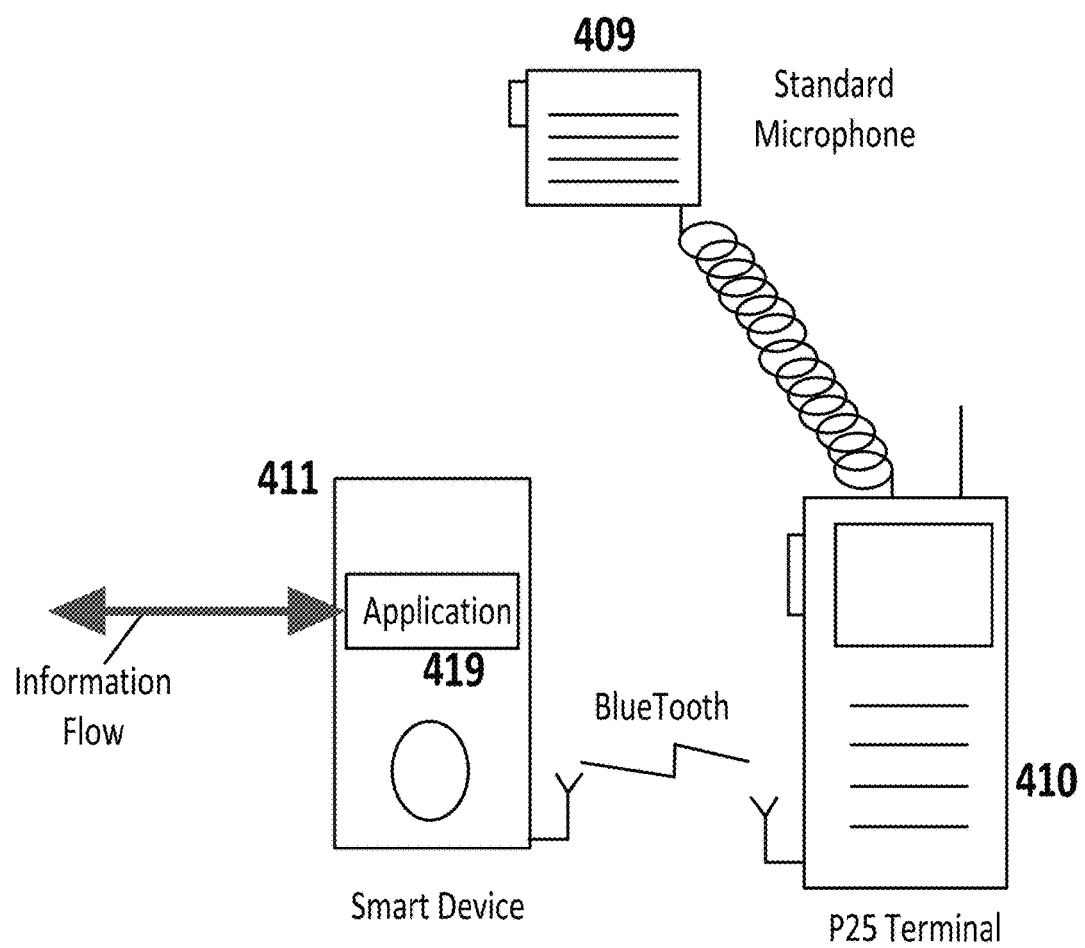

FIG. 3 Details of one method of implementing the multi-bearer terminal.

Figure 4:
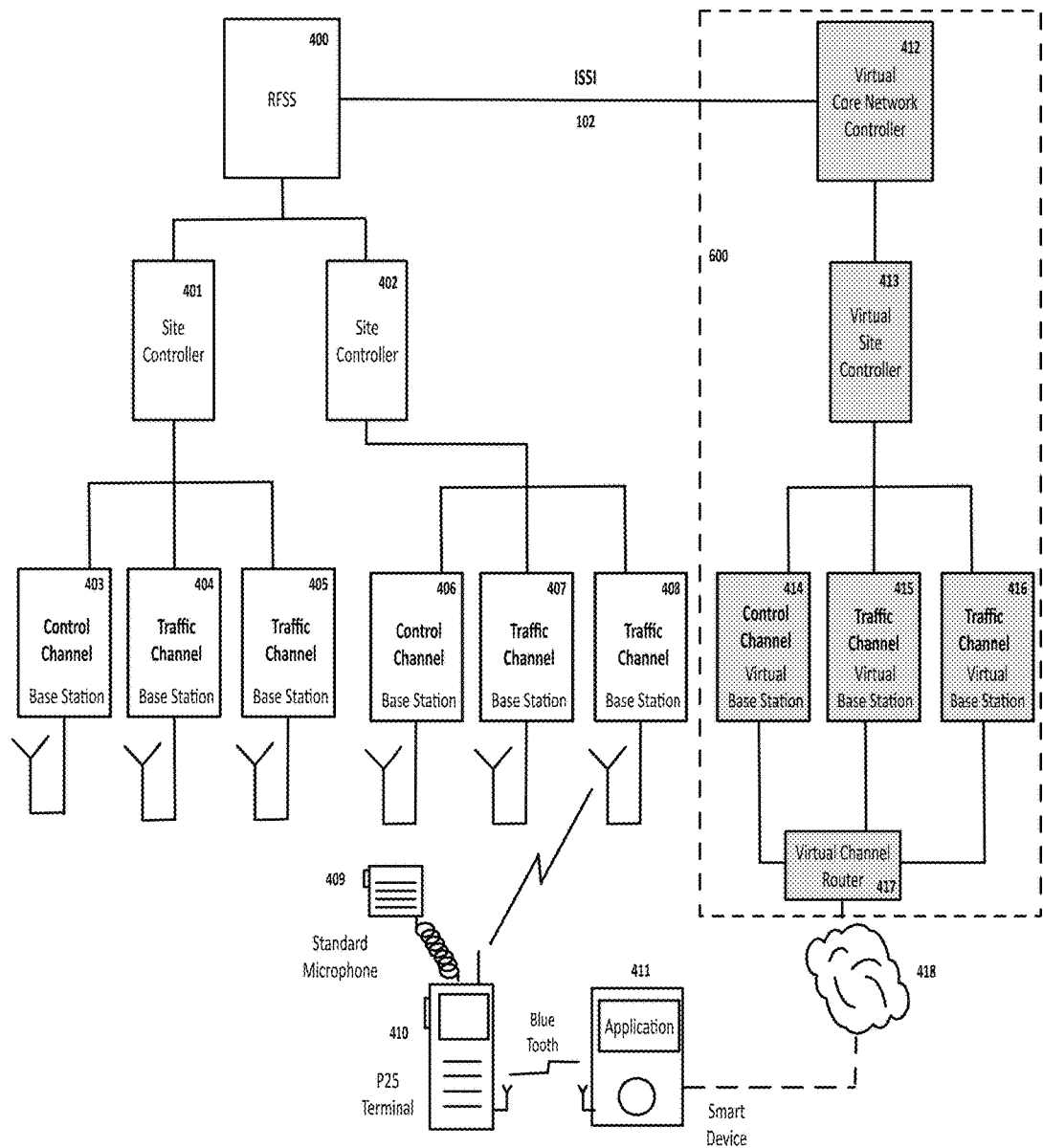

FIG. 4 An architecture showing connection between virtual and physical LMR networks.

Figure 5:
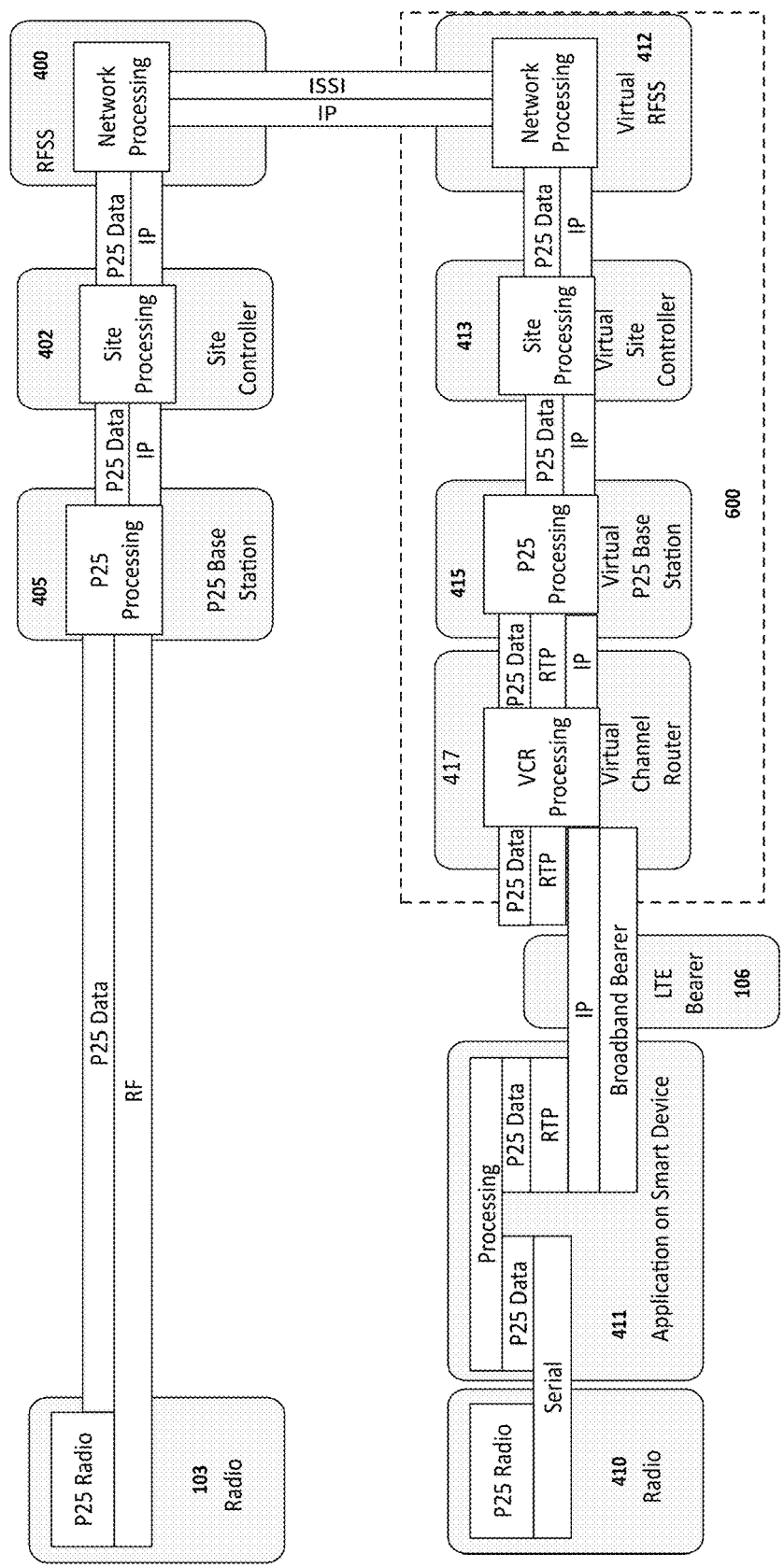

FIG. 5 A protocol based description of interfacing between virtual and physical LMR networks.

Figure 6:
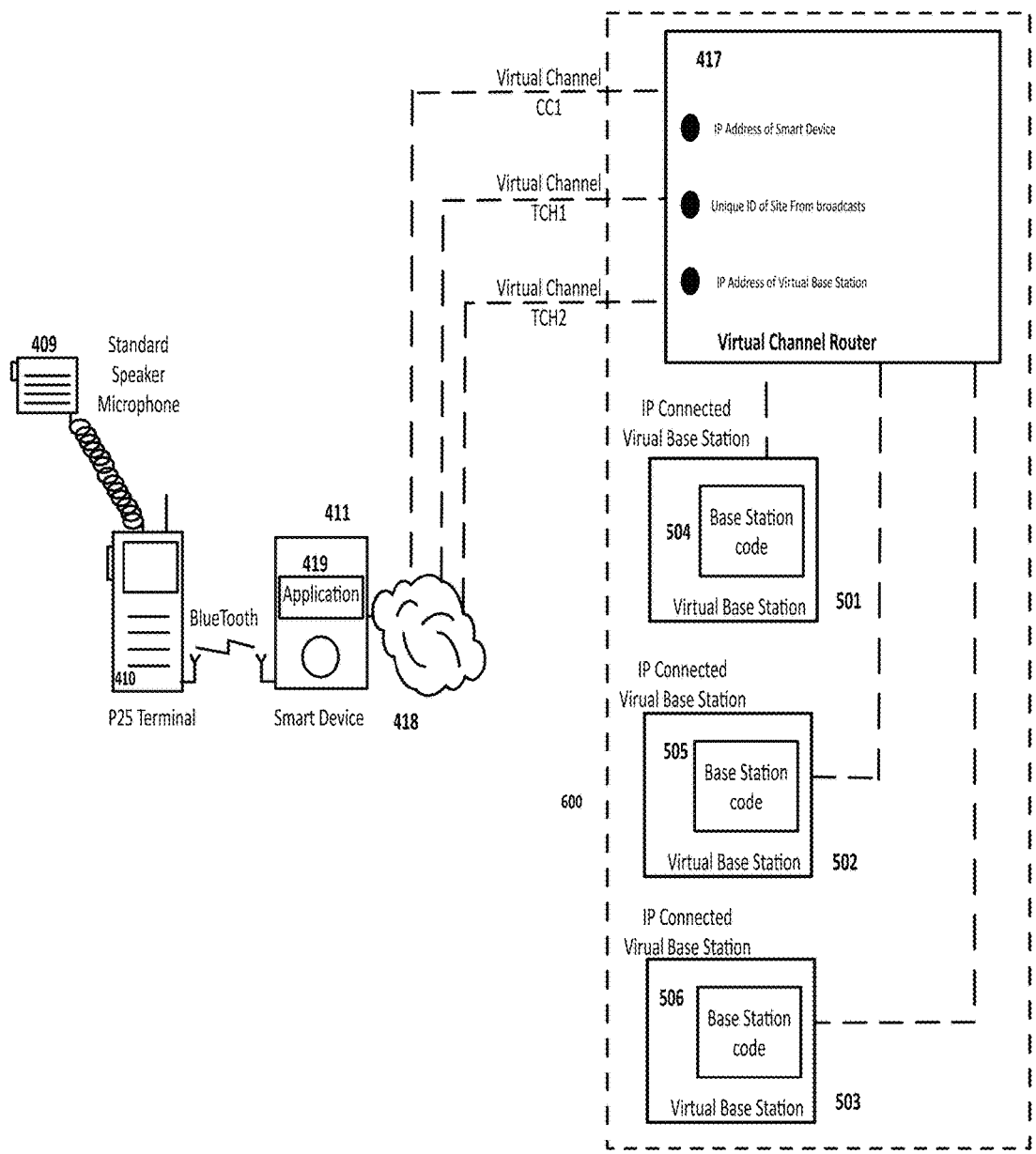

FIG. 6 Architecture for a Virtual Channel Router.

Figure 7:
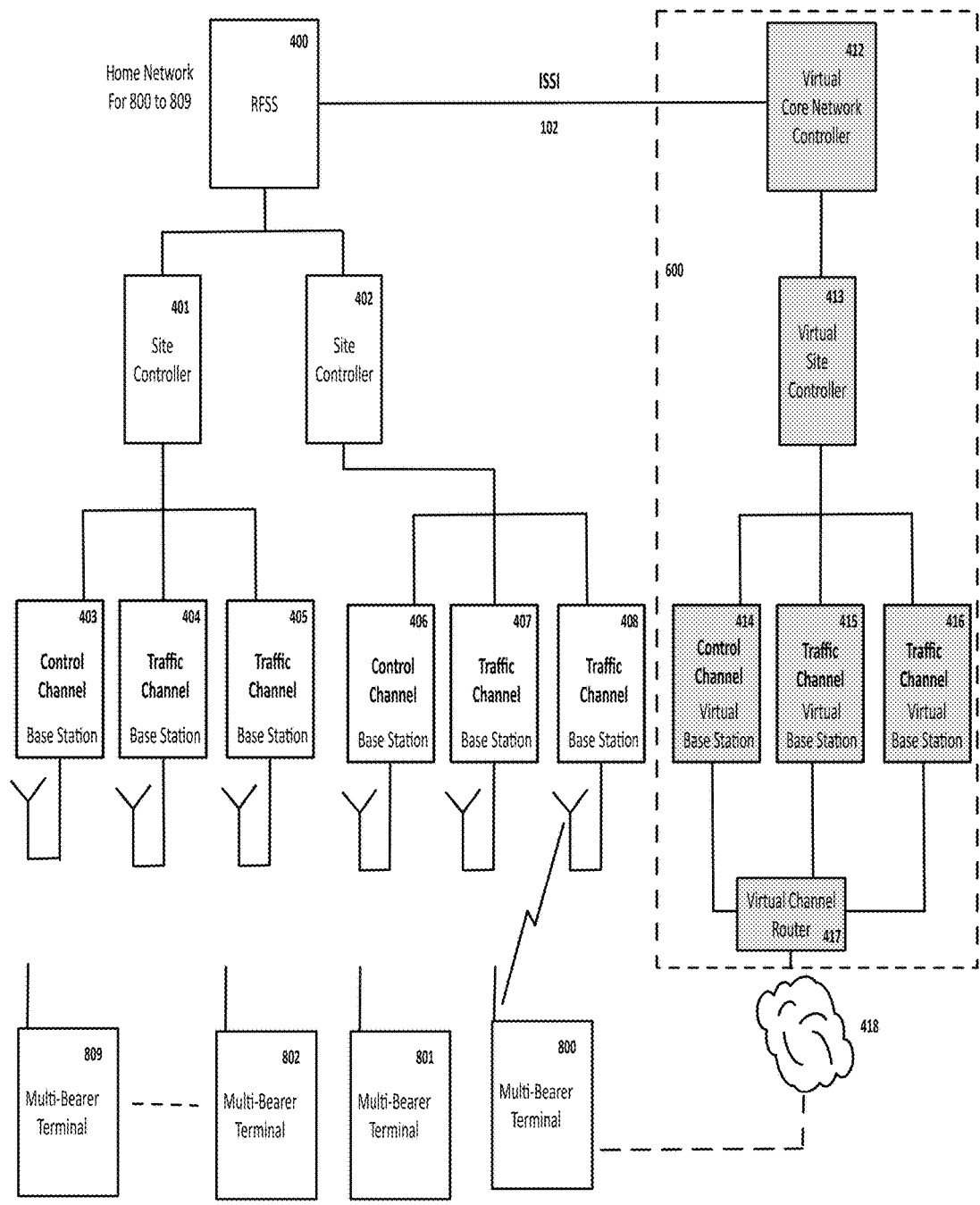

FIG. 7 Home network allocation of terminals on a physical network.

Figure 8:
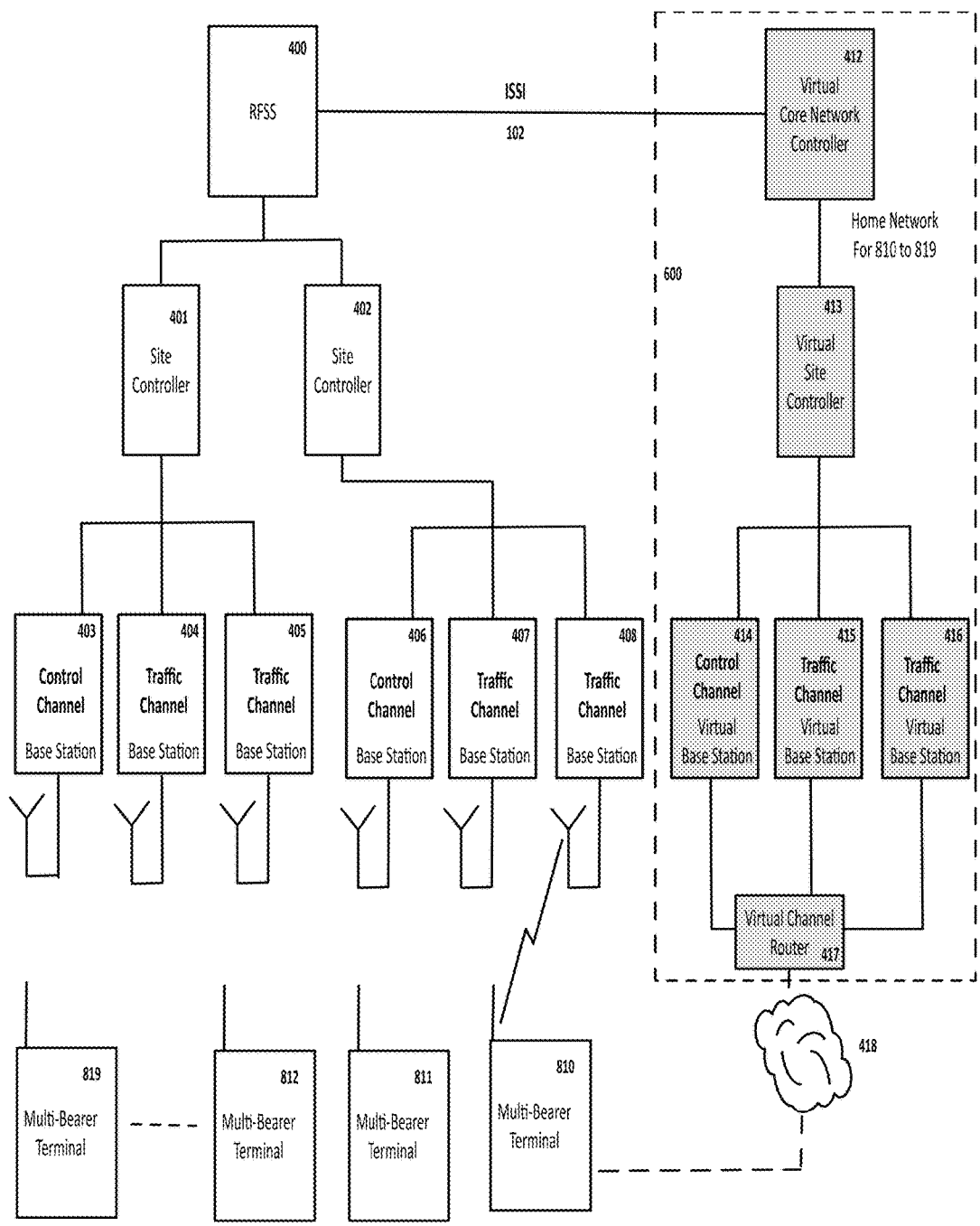

FIG. 8 Alternative configuration where terminals homed on a virtual network.

Figure 9:
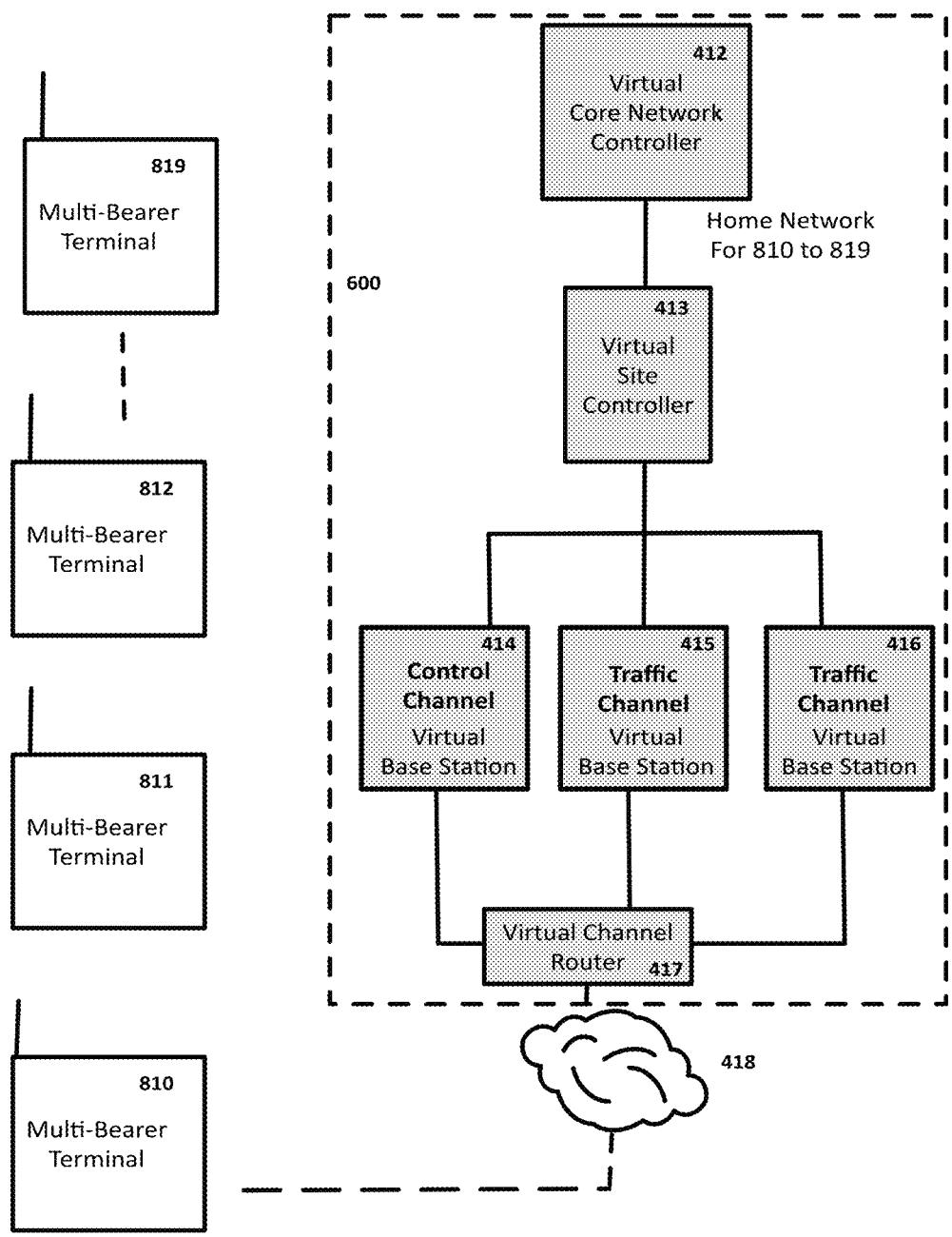

FIG. 9 Home network allocation of terminals operating on a virtual network only.

Figure 10:
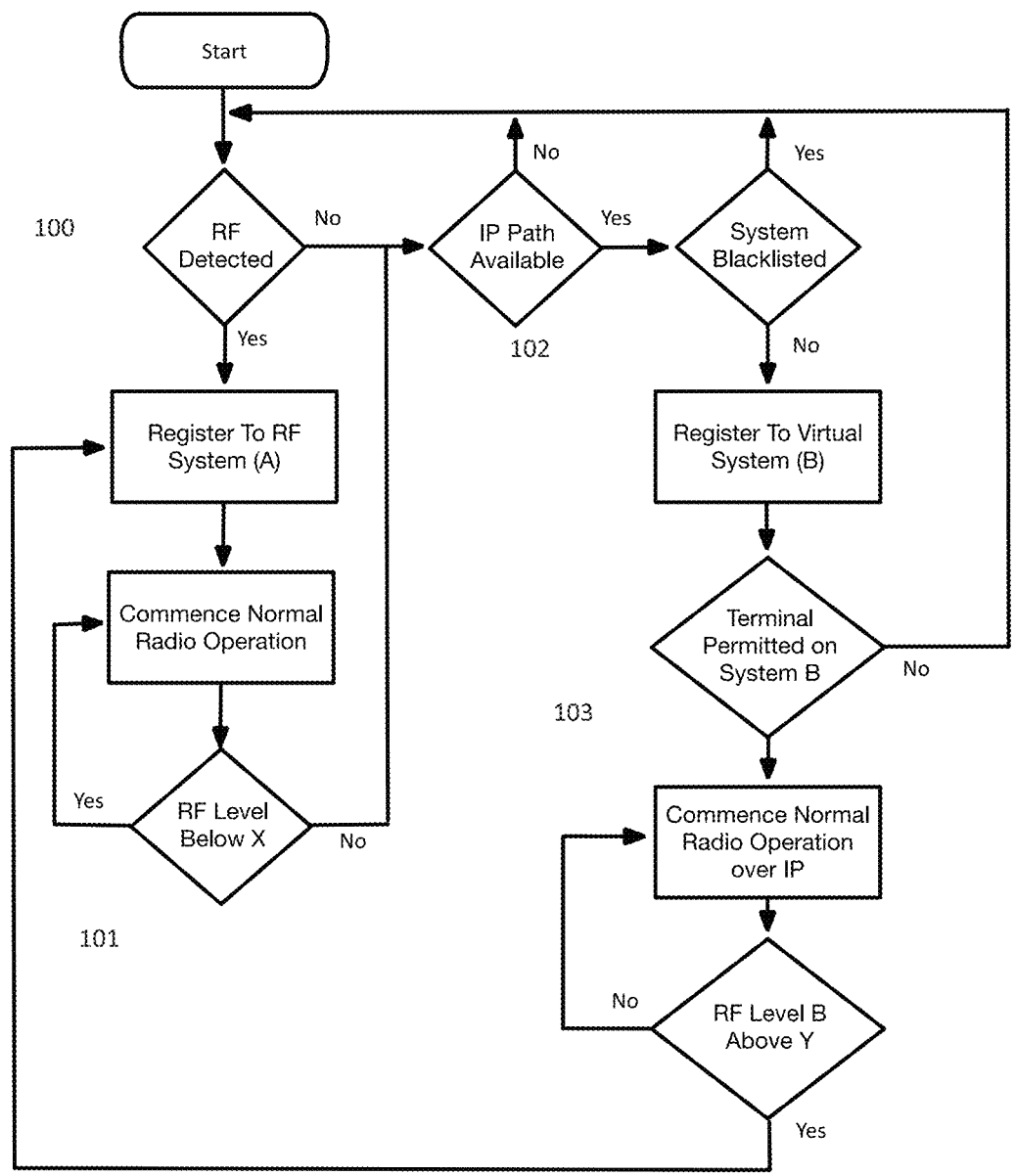

FIG. 10 Algorithm for choosing to register to real or virtual networks.

Figure 11:
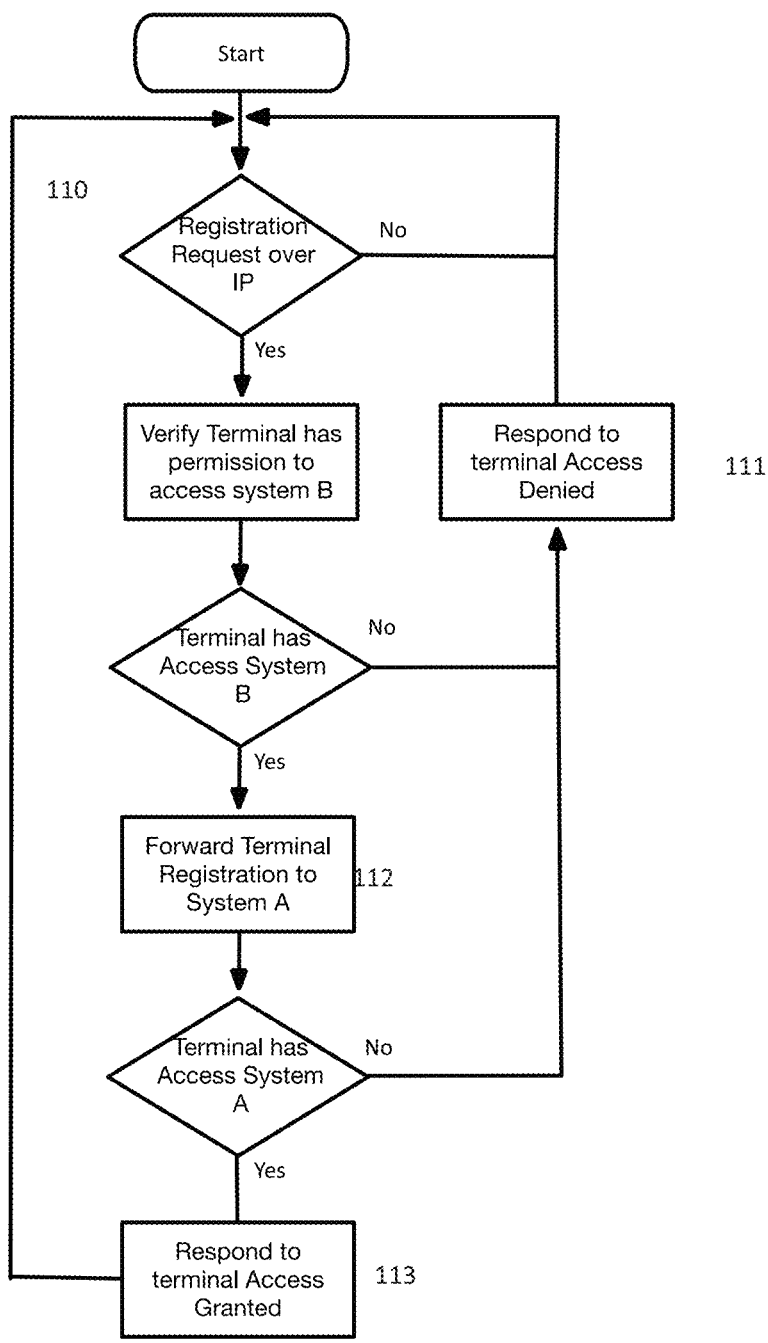

FIG. 11 Registration algorithm on virtual network.

Figure 12:
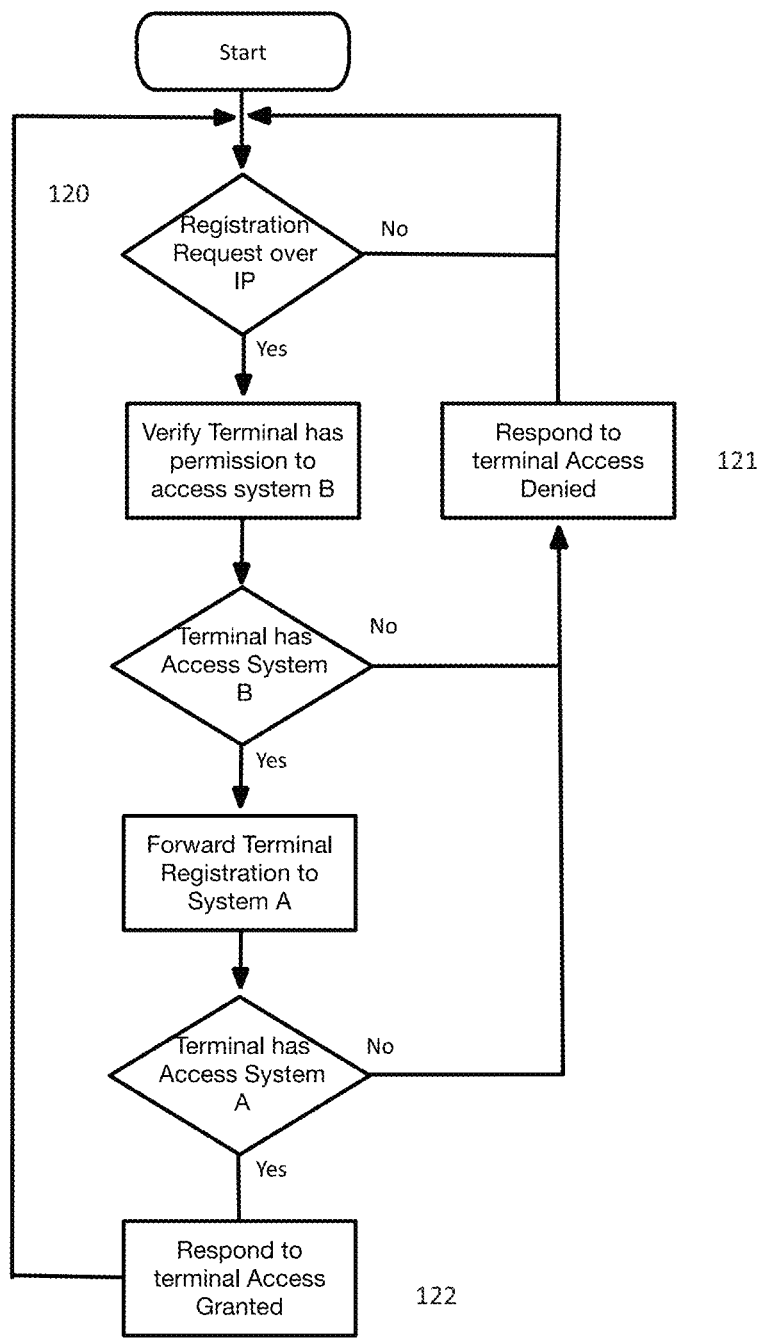

FIG. 12 Registration algorithm for physical network receiving request from virtual network.

Figure 13:
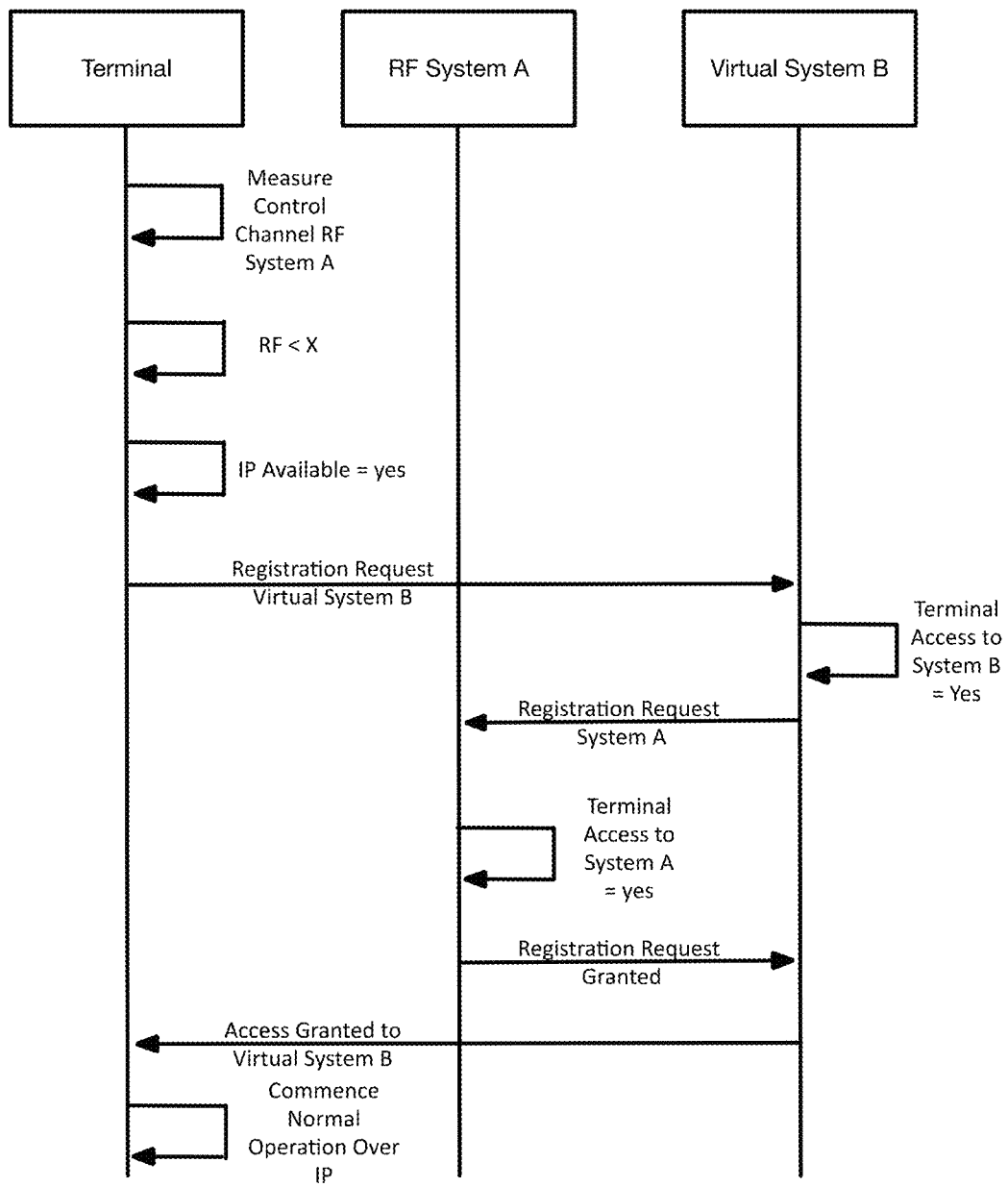

FIG. 13 Sequence diagram for registration via virtual network.

Figure 14A:
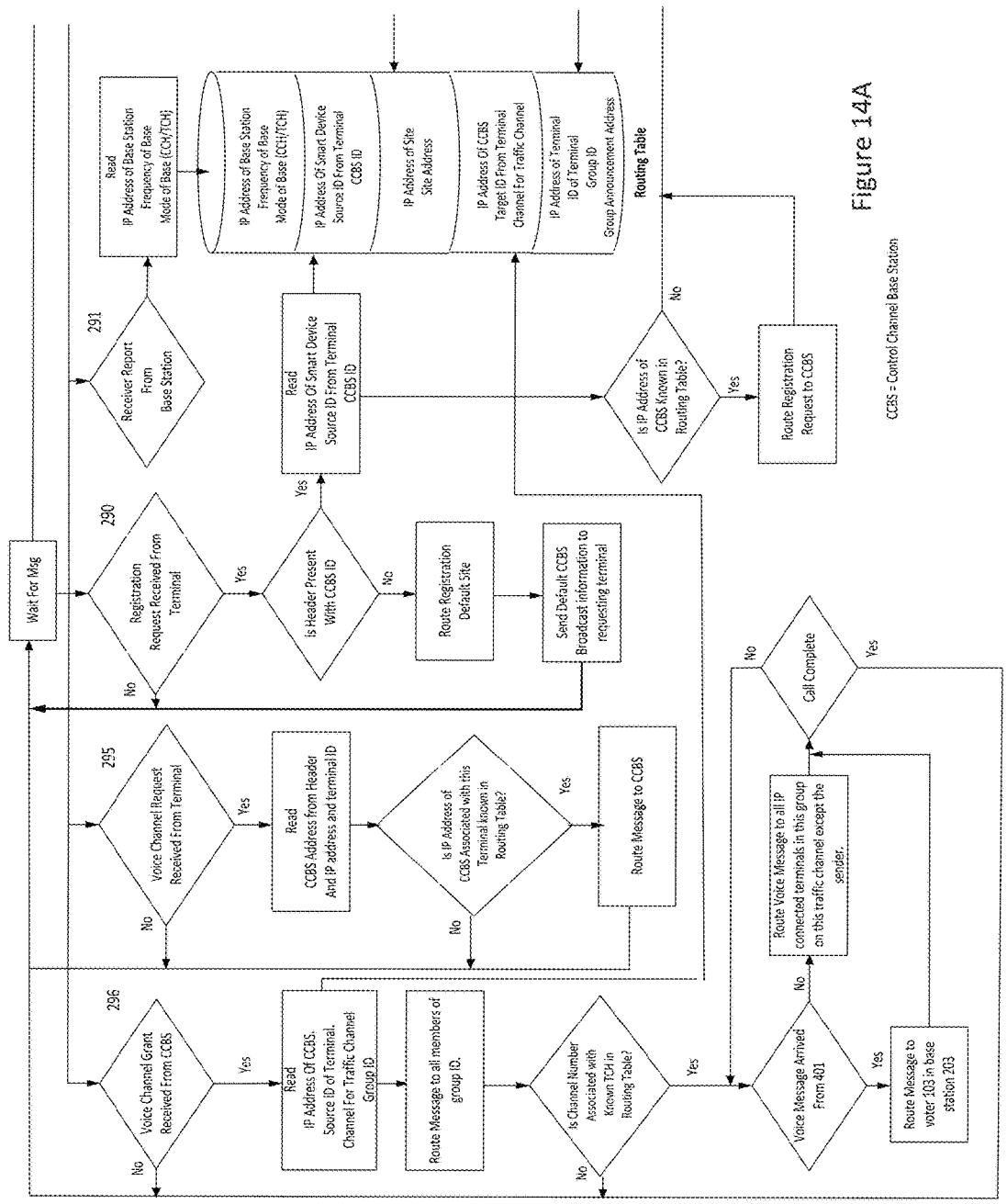
Figure 14B:
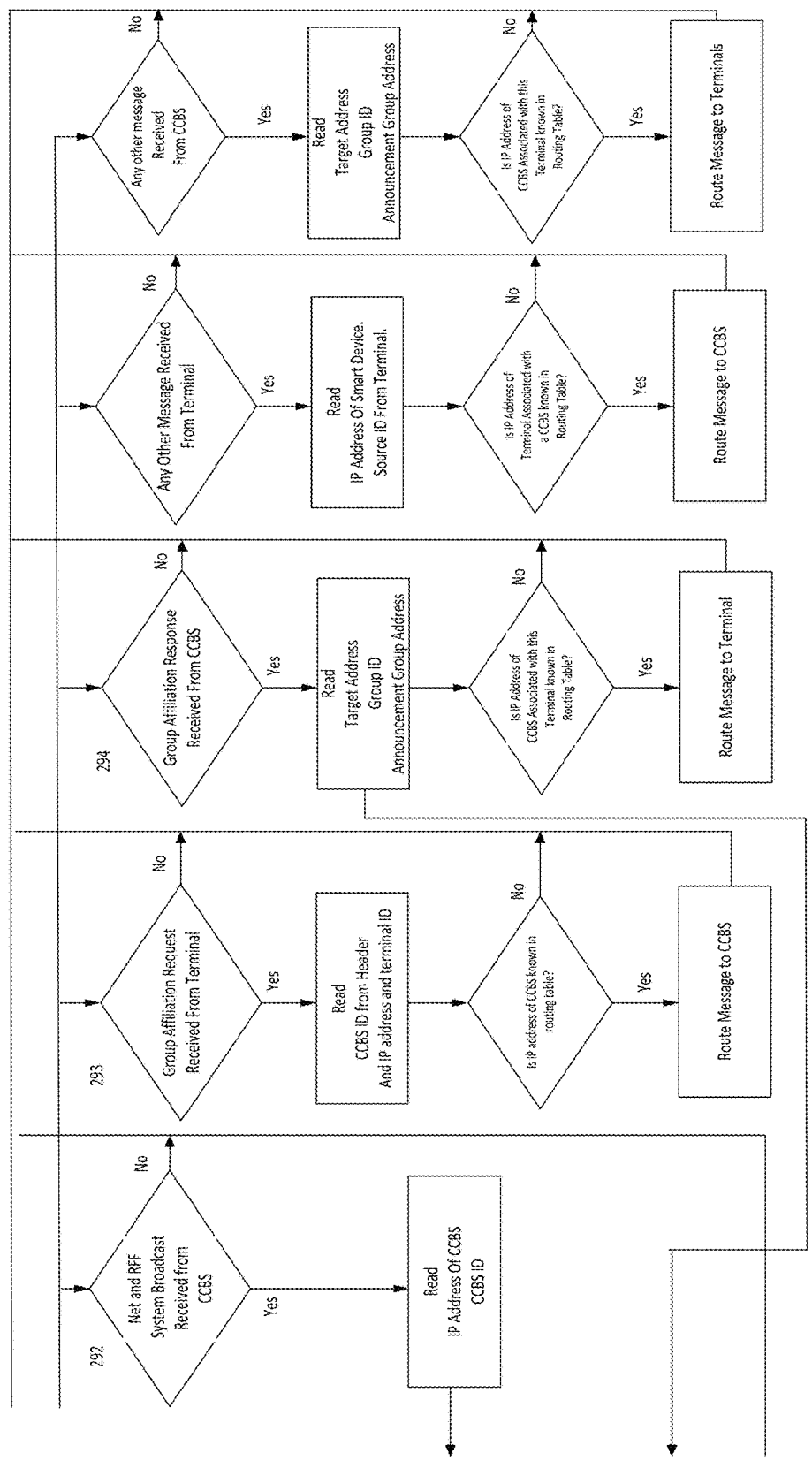

FIGS. 14A, 14B Algorithm for managing LMR traffic on virtual network.

Figure 15:
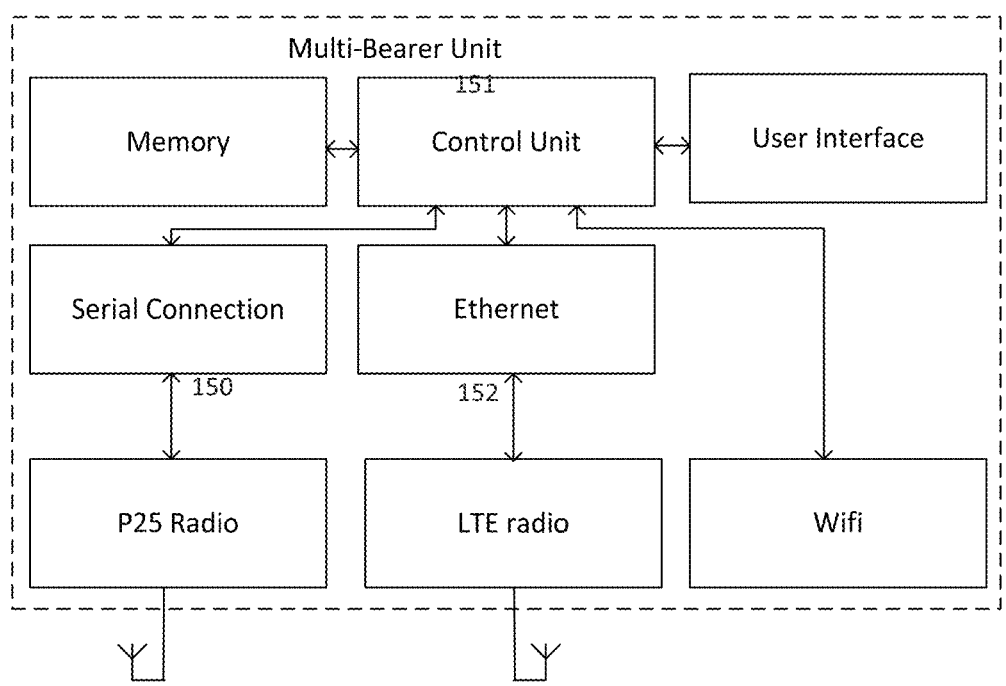

FIG. 15 Architecture for a multi-bearer device.

Figure 16:
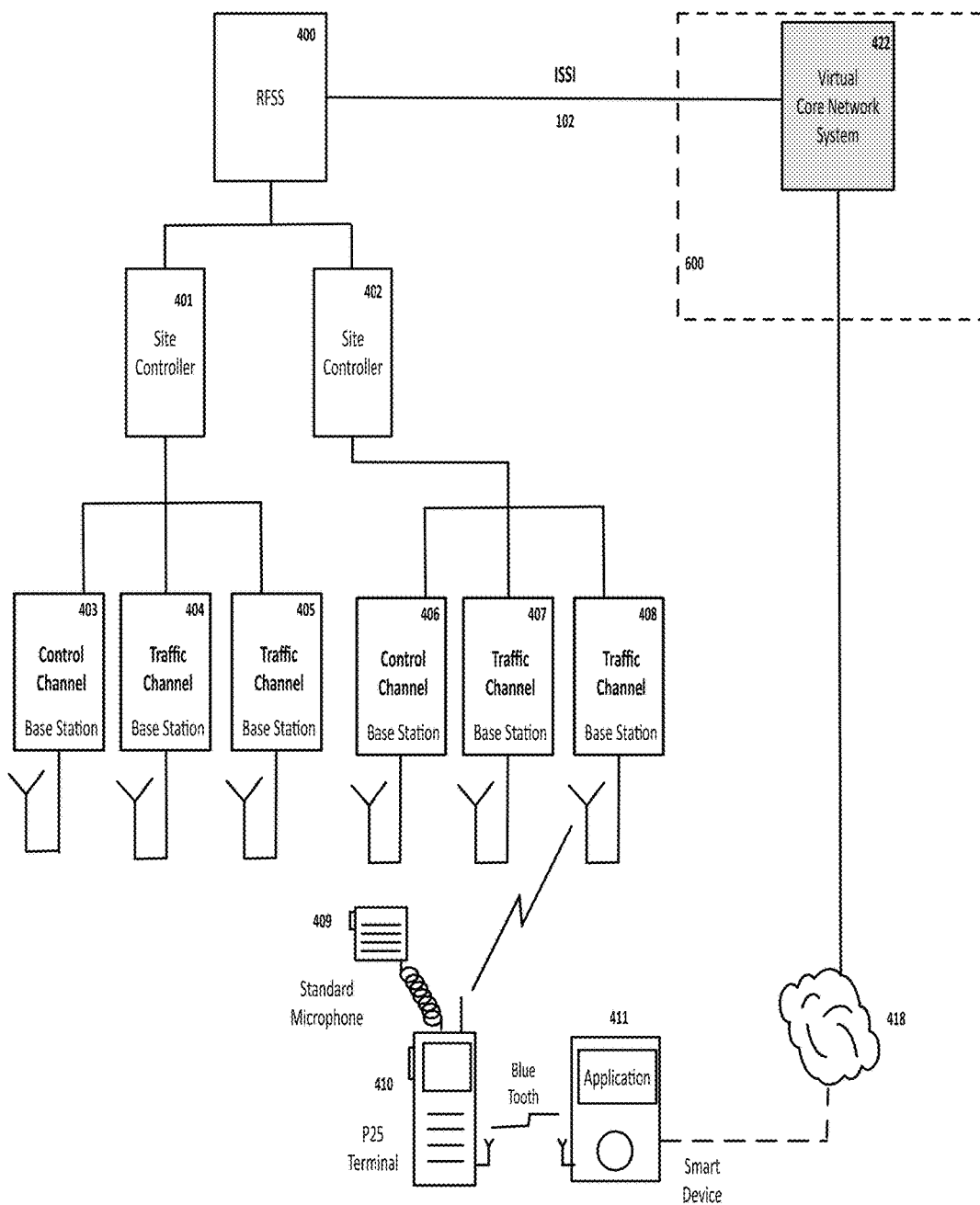

FIG. 16 Virtual network as a software entity connected to physical network.

DESCRIPTION OF PREFERRED EMBODIMENTS

Referring to the drawings it will be appreciated the invention may be performed in a variety of ways using a number of platforms that communicate LMR information across an LMR RF channel and through an IP capable network.

In this example, APCO P25 is described as the LMR system. In general terms however any form of LMR could be used including Terrestrial Trunked Radio (TETRA), Opensky, NetworkFirst, Enhanced Digital Access Communications System (EDACS) and Digital Mobile Radio (DMR). Further, the IP capable platform may be any data capable standard which can deliver relatively high data rates to enable IP communications. Examples include 3GPP standards such as LTE as well as other standards such as 3GPP2, WiMax and WLAN.

A multi-bearer device is described that is capable of both LMR connectivity and wireless broadband connectivity which in turn is capable of supporting IP. An LMR device is paired with an IP capable device. This can involve a physical pairing of capability or a pairing through some other form such as Bluetooth or cable. In this example, all devices (or paired devices) that are capable of operating across dual bearers have an IP address. This IP address becomes associated with the LMR ID of the radio.

The interface used between the physical and virtual network may be Inter RF Subsystem Interface (ISSI) in the case of P25 trunked operation or Application Interface Specification (AIS) in the case of DMR. The method can also be used for conventional operation using Digital Fixed Station Interface (DFSI). The interface described here is ISSI.

FIG. 1 illustrates the main components of a system that integrates physical and virtual LMR networks. A multi-bearer terminal device 107 includes a normal P25 terminal and an LTE (or cellular) terminal connected via a processing hub capable of processing information between the units. The multi-bearer device 107 is within the coverage area of a P25 cell 105 which is connected to a physical P25 RFSS Controller 400. The multi-bearer device is also within range of a base station providing an LTE cell 106. This cell is part of a normal cellular network 108 having multiple base stations and cells, representing an IP platform for a virtual LMR network. The Virtual Core Network System 600 is connected to the physical LMR network 400 via an ISSI network 102.

In the case of a DMR system, unit 400 would be a DMR Controller instead of a P25 RFSS Controller. Interface 102 would be AIS which is the DMR equivalent of ISSI. The virtual core network 600 would become a DMR virtual core network instead of a P25 version.

The multi-bearer device 107 is capable of trunked P25 operation over either standard P25 RF coverage or through an IP path which in this case is facilitated through a cellular connection. The multi-bearer device can send LMR information via standard P25 RF or through the IP path over cellular to a virtual LMR network.

FIG. 2 is an overview of components in a trunked P25 system. Base station 405 represents a control channel, labelled RF Channel CC1 in a trunked system. Base stations 404 and 405 represent traffic channels, TCH1 and TCH2 that can be allocated using CC1 offered on base station 403. It is typical for a physical site to be managed by a site controller 401. A second site is also shown controlled by site controller 402 which in turn controls control channel 406 and traffic channels 407 and 408. Each site controller is connected to a P25 trunked controller referred to as a Radio Frequency Sub System Controller (RFSS Controller). The P25 RFSS Controller 400 is the central point of control in the network.

FIG. 3 shows one possible realisation of the multi-bearer device 107 in FIG. 1. In this case a standard P25 terminal 410 is connected via Bluetooth to a smart device 411 which has a special application 419 designed to pair with the P25 terminal and preferentially process messages from the terminal. In this case a standard microphone 409 is also attached to the terminal. The multi-bearer hub can be realised in a number of ways using a number of standard interfaces including WLAN. Other examples might include using a smart micro-phone which is connected via a serial cable to the radio and pairs with the smart device. Another example may be a mobile station which uses a standard serial port to connect with a suitable processing platform that may be a smart device. All combinations of processing architecture are included.

FIG. 4 shows a joint physical and virtual architecture. Components 400 to 408 form a physical P25 network made up of a P25 RFSS Controller 400 and two site controllers 401 and 402 and a plurality of base stations 403 to 408 making up two control channels and four traffic channels. A Virtual Core Network System 600 is made up of components 412 to 417. In this architecture 412 represents a Virtual Core Network Controller (Virtual P25 RFSS Controller) connected to a virtual site controller 413 and a set of virtual base stations 414 to 416 representing a control channel and two traffic channels. The base stations 414 to 416 connect to a Virtual Channel Router 417 that manages all P25 traffic operating over the IP network. The Virtual Core Network Controller 412 is connected to the physical P25 RFSS Controller 400 via an ISSI interface. Also shown in FIG. 4 is a multi-bearer terminal as described in FIG. 3. The Multi-bearer terminal communicates via RF to the physical P25 network 400 to 408. It also connects to the virtual network 600 using IP over a cellular network 418.

FIG. 5 illustrates the flow of information through a joint physical virtual system from a P25 radio 410 that is sending information via the virtual system 600 through to a normal P25 radio 103. The P25 radio 410 is the source of a P25 message stream that is passed across via a serial port profile over Bluetooth to an application running on a smart device 411. This P25 data is processed to a format that it will be ready to be received at a Virtual Channel Router (VCR) 417. Following formatting the P25 data is packaged in the smart phone within the Real Time Protocol (RTP) and sent in IP over a broadband bearer such as LTE. Upon arriving at the VCR the data is unpacked and processed according to an algorithm described in FIG. 14. The VCR selects the correct virtual channel base station to receive the P25 data stream. In this example the stream is sent to a virtual traffic channel base station 415.

The virtual base station 415 processes the P25 stream in the same way as if it had arrived via RF. For example Forward Error Correction decoding is applied and the individual vocoder (voice) and signalling messages are extracted. These messages are sent to the virtual site controller 413. The virtual site controller is managing traffic and control of several base stations. It receives the P25 registration request and passes it to the Virtual RFSS 412 where the P25 registration request is examined. In particular, addressing of the packets is examined. If the home network of the destination address is located on another network then the data stream is passed across to that network via ISSI. In this case the radio ID in the registration request is homed on the physical RFSS 400 hence the request is passed across ISSI. Upon receiving the request stream, the RFSS 400 sends the response back to the terminal. The response to a physical radio is shown by way of example. The P25 response is passed to the physical site controller 402 which routes the response to the physical base station 405. Now the P25 response is transmitted over the physical RF channel and received by radio 103.

FIG. 6 shows an architecture for managing P25 traffic originating from a multi-bearer terminal as described in FIG. 4. All traffic originating from or directed to the multi-bearer terminal connect to parts of the Virtual Core Network System 600. Here, the virtual channels connect to a virtual channel router 417. Three virtual channels are illustrated, a Control Channel (CC1) and two traffic channels TCH1 and TCH 2. The Virtual Channel router manages all traffic from the IP network and directs the traffic between the multi-bearer terminal and the software modules representing the virtual base stations. Specifically virtual base station 501 operates a software module 504 acting as a control channel. Virtual base stations 502 and 503 represent traffic channels and operate software modules 505 and 506 respectively as traffic channels.

The virtual base stations receive LMR signalling in IP as opposed to RF. In a normal base station LMR signalling is received at an antenna and demodulated to a point where a bit stream (or codewords) exists. In the case of a virtual base station, the bit stream (or codewords) are received within IP packets. These packets are then processed to extract the relevant information that needs processing.

The virtual base stations also transmit LMR signalling in IP as opposed to RF. In a normal base station LMR signalling is transmitted at an antenna following modulation of a bit stream (or codewords). In the case of a virtual base station, the bit stream (or codewords) are transmitted within IP packets. Each virtual base station 504, 505 and 506 forms part of a virtual P25 system detailed in FIG. 4.

FIG. 7 builds upon the description of FIGS. 3, 4, 5 and 6 to add multi-bearer terminals 800 to 809. Each of these multi-bearer terminals can connect to either the physical P25 network via RF or they can connect to a virtual P25 network via IP operating over a cellular network 418. The multi-bearer terminals 800 to 809 are homed on the physical network. In other words, the primary point of connection for the purpose of registration exists in the physical P25 RFSS Controller 400. The Virtual Core Network System 600 contains the Virtual Core Network Controller (VCN Controller) 412 which is also aware of these terminals, and implements software processes that pass all traffic between the VCN Controller 412 and the multi-bearer terminals 800 to 809 operating via the virtual network shall across the ISSI interface to the physical P25 RFSS Controller 400.

FIG. 8 shows an alternative configuration with a plurality of multi-bearer terminals 810 to 819. These terminals can also connect to the physical P25 RFSS Controller 400 via RF and can connect via IP to the VCN Controller 412 which forms part of the Virtual Core Network System 600. In this case however, the multi-bearer terminals 810 to 819 are homed on the VCN Controller 412. The physical P25 RFSS Controller is also aware of the terminals 810 to 819, and implements processes that pass any traffic communicating to these terminals across the ISSI interface to the VCN Controller 412.

FIG. 9 shows another configuration in which the multi-bearer terminals 810 to 819 are connected solely to the VCN Controller 412 as part of the Virtual Core Network System 600. This particular configuration highlights how a set of P25 terminals with IP capability can operate over a virtual network in the absence of physical RF base stations. This system is effectively a virtual LMR network provided in software, connected through a router, to a physical cellular network which communicates with the multi bearer devices.

In an alternative form of FIGS. 7 and 8, rather than one LMR network being physical and the other being virtual, it is also possible to operate in a mode where a first virtual network connects to a second virtual network. In other words, a virtual system 600 could interoperate with another virtual network using the same approach. More specifically this would mean a virtual network controller 412 would interface to another virtual network controller, preferably through ISSI, AIS or DFSI or in a direct mode of communication. Both virtual networks service user devices through one or more physical cellular networks.

FIG. 10 shows a process for registration at the multi-bearer terminal. Initially a check is made to establish if RF is available. If RF is available 100 then registration occurs to the physical RF system (A). Normal P25 radio operation then takes place over the physical RF network. Periodically a check 101 is made to establish if the RF signal level on the physical network drops below a threshold X. If the threshold X is breached then a check 102 is made to establish if IP is available. If the IP path is available then a final check is made to establish if this terminal has been blocked from operation on the virtual network. Assuming the terminal is not blacklisted then the multi-bearer terminal registers with the virtual system (B). If the terminal is not permitted on system B then the process returns to the start. If however the terminal is permitted 103 on system B then normal P25 operation begins operating over the IP network. Periodically a check is made to see if the physical RF level goes above a threshold Y. If that occurs then registration occurs with the physical network.

FIG. 11 shows a process for registration via the virtual network. A terminal registration request 110 is received via IP. The virtual system verifies whether or not this particular terminal is permitted to access the virtual system B. If it is not then a response indicating access denied 111 is sent to the terminal. If it is permitted then the terminal request is sent 112 to the physical P25 RFSS Controller A. If the physical P25 RFSS Controller responds to indicate that access is denied then a message is sent to the terminal indicating access is denied. If system A responds that access is permitted then a message is sent 113 to the terminal to indicate access is permitted.

FIG. 12 is a flow diagram for the physical P25 RFSS Controller A when receiving registration requests via ISSI. Upon a registration request being received 120 via ISSI for a particular terminal, the system verifies if access is permitted. If access is not permitted then a response is sent 121 over ISSI indicating access is denied. If access is permitted then a response is sent 122 indicating access is granted.

FIG. 13 shows a sequence diagram for registration via the virtual network. Initially the terminal measures the RF level of the physical control channel. If the RF level is less than X then a further check is made to establish if the IP path is available. Assuming IP is available then a registration request is made to the virtual system B. The virtual system B verifies that access to system B is permitted. Following this a registration request is sent to physical system A. The physical system A verifies that access is permitted and responds confirming access is granted. Virtual system B then sends an indication to the terminal confirming access is granted. Following this the terminal proceeds to operate normally using P25 over IP.

FIGS. 14A and 14B show a flow diagram for operation of a VCR 417 similar to the MBR in US 2016/0057051, the content of which is incorporated herein by reference. Initially the VCR is waiting for a message to arrive. It processes various messages differently with a view to building up a routing table to enable correct connectivity of devices. If the VCR receives 290 a registration request then it will first establish if the request is preceded by a header identifying the control channel base station ID which the device is seeking to communicate with. If the header is not present then the message is routed to a default control channel base station and the default control channel base station ID is sent back to the terminal.

If the registration request is preceded by a header identifying the control channel base station ID then the unique ID of that base station is stored in the lookup table. Next, the table is checked to see if an IP address matching that control channel base station ID is known. If it is then the registration request is sent to that control channel base station using its known IP address. If is it not known then the VCR simply waits for the next message to arrive. It may optionally respond to indicate the control channel base station ID is unknown.

If the VCR receives 291 a Receiver Report from another base station on the system then the table is updated to record the IP address of that base station, its operating frequency and the mode of the base station either control channel or traffic channel. The mode can be used to shorten the search algorithm required when seeking to match a control channel base station ID versus its IP address.

If the VCR receives 292 either NET or RFSS System broadcast messages from a control channel base station then the IP address of the sending base station along with the unique P25 ID of that base station is exacted and used to update the table.

If a Group Affiliation Request is received 293 from the terminal then the IP address and source ID of the terminal are read. The unique P25 ID of the control channel base station is read from the header. If a known IP address existing in the table matching that P25 ID then the message is routed to that control channel base station.

If a group affiliation response is received 294 from a control channel base station then the target ID of the terminal is read. The routing table is used to verify the IP address of the terminal. The Group ID is also added to the table and this terminal ID/IP address is associated with the group. Having extracted the relevant routing information the group affiliation response is sent onto the terminal/application.

If a voice channel request is received 295 from the terminal then the control channel base station ID is read from the header. This is checked against the routing table to establish the IP address of the control channel base station. The IP address of the smart device associated with the terminal is extracted along with the source ID of the terminal and this is added to the routing table.

If a voice channel grant is received 296 from a control channel base station then the IP address of the control channel base station, the terminal ID, the channel to which the grant has been assigned and the group ID are extracted. The channel grant is then routed to the IP address of the smart device associated with the terminal ID and to all the terminals that are members of this group. This is achieved by extracting from the routing table, the terminal ID's affiliated with the Group ID and IP addresses associated with each of those terminal IDs.

Next, a check is made to establish if the traffic channel number is known in the routing table. If it is, the IP address of that traffic channel is extracted using for routing. Voice messages arriving from an IP connected terminal such as 401 are routed to the voter in the traffic channel base station. In this case that's voter 103 in base station 203. Voice messages arriving from the IP address of the traffic channel base station are routed to all IP connected terminals in this group with the exception of the sender. The channel number is used to establish the IP address of the traffic channel to which this voice call has been assigned. The routing of the call continues until the call is complete.

The router preferably establishes address and ID data for each of the stations and devices in the communication system. This includes device data having an LMR ID and an individual IP address for the multi bearer devices, physical site data having an LMR ID and an individual IP address for the physical LMR bearer base stations in the system, and virtual site data having an LMR ID and an individual IP address for the virtual LMR base stations in the system. Other data such as group ID and address information may also be established.

FIG. 15 shows a typical multi-bearer device. A P25 radio 150 is connected by a serial port to a control unit 151. The control unit receives P25 information, processes the information and transports it across a suitable IP capable bearer. In this case an LTE radio 152 provides the bearer. The control unit establishes an IP connection to a remote destination and begins streaming the P25 information to the destination. Also shown as an optional bearer is Wi-Fi. This represents an alternative wireless connection to cellular. The code used to enable the processing and formatting required for IP connectivity is held with a memory unit. An optional UI can be added to the system to change configurations. There are several alternative configurations to the above platform. For example such platform can be established through using external smart phones as the LTE connection or alternatively an LTE connection may be internal to a platform.

FIG. 16 shows how the architecture of a virtual network may be considered as a system module or single system 422. The network is implemented as software and data stored in one or more servers. Each server has at least one processor and memory in the usual way and the software causes the processor to act in the manner of a network as described above. In FIG. 4 the architecture of the virtual network 600 was shown in a traditional physical form made up of a site controller 413 and various base stations 414, 415 and 416. When a radio channel is operated over a broadband pipe, such as provided in network 418, the traditional constraints of the control channel may no longer apply.

A traditional LMR control channel can only support a certain number of users and this is dictated by the channel bandwidth. That bandwidth is now much larger so many more terminals can be supported. Further, the base stations 414-416 of FIG. 4 no longer require any physical RF equipment because no actual RF will ever be sent or received. The concept of a control channel base station is no longer so well defined. The base station becomes a software module transporting data between the VCR and the virtual site controller. The same observations are made for the traffic channels 415 and 416 which means they too become simple pipes between the VCR and the virtual site controller. All base stations can be absorbed as modules into the virtual site controller.

Consider the virtual site controller 413. This module is responsible for the management and traffic routing from the base stations 414-416 to the virtual core network 412. Given the physical base stations are no longer necessary, the functions of the site controller can also be collapsed. The functions of the VCR 417 can now be collapsed directly with the virtual site controller to produce a single module, the virtual core network system 422 shown in FIG. 16.

The invention claimed is:

1. A method of operating a router in a multi bearer radio system having a Land Mobile Radio (LMR) bearer and an Internet Protocol (IP) bearer, including:
    establishing device data in the router having an LMR Identification (ID) and an individual IP address for each of a plurality of multi bearer devices in the system,
    establishing physical site data in the router having an LMR ID and an individual IP address for each of a plurality of physical LMR bearer base stations which form a physical network in the system, and
    establishing virtual site data in the router having an LMR ID and an individual IP address for each of a plurality of virtual LMR base stations which form a virtual network in the system,
    wherein the device data, the physical site data and the virtual site data established in the router, enable the router to assist communication between multi-bearer devices using the physical network and multi-bearer devices using the virtual network.

2. The method according to claim 1 wherein the physical and virtual networks communicate using Inter RF Subsystem Interface (ISSI), Application Interface Specification (AIS) or Digital Fixed Station Interface (DFSI).

3. The method according to claim 2 wherein the virtual network receives IP messages from the multi bearer devices through a router from a network of physical cellular base stations.

4. The method according to claim 1 wherein the virtual site data includes data for one or more virtual site controllers which each control one or more virtual LMR base stations in the virtual network.

5. The method according to claim 1 wherein the virtual site data includes data for a virtual network controller which controls one or more virtual site controllers in the virtual network.

6. The method according to claim 1, wherein the virtual network is implemented as one or more software modules.

7. The method according to claim 1, wherein each of the plurality of virtual LMR base stations is a software module.

* * * * *